W. H. PALMER.
NUT LOCK.
APPLICATION FILED JUNE 10, 1920.
1,376,159.
Patented Apr. 26, 1921.
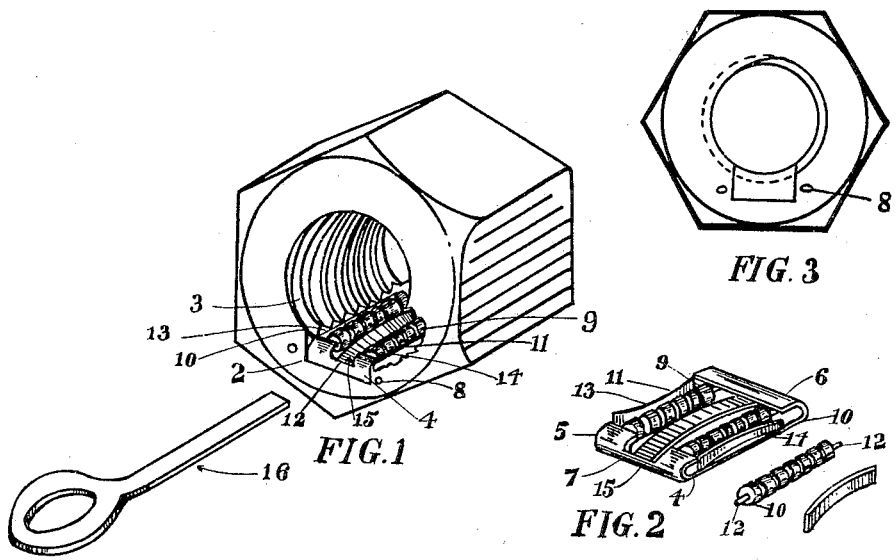
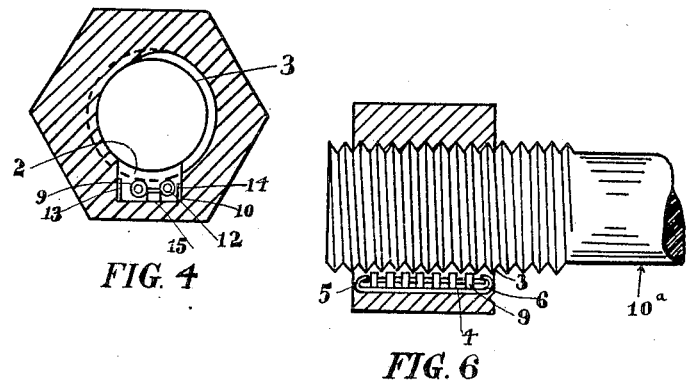
INVENTOR
W. H. Palmer
BY E. J. Featherstonhaugh
ATTORNEY

UNITED STATES PATENT OFFICE.

WILLIAM HENRY PALMER, OF MONTREAL, QUEBEC, CANADA.

NUT-LOCK.

1,376,159.  Specification of Letters Patent.  Patented Apr. 26, 1921.

Application filed June 10, 1920. Serial No. 388,064.

*To all whom it may concern:*

Be it known that I, WILLIAM HENRY PALMER, a subject of the King of Great Britain, and residing at 2044 Mance street, in the city and District of Montreal, in the Province of Quebec, in the Dominion of Canada, have invented a new and useful Nut-Lock, of which the following is the specification.

The invention relates to nut locks as described in the present specification and illustrated in the accompanying drawings that form part of the same.

The invention consists essentially of the novel construction and arrangement of parts whereby in the insertion of a pin an obstructing member is righted so as to present an unobstructed way for the threads of the bolt.

The objects of the invention are to facilitate the removal of a lock nut particularly in high class machinery where it is desirable to preserve the bolt and nut from rough handling; to insure a positive and constant lock for the nut from rotation in one or both directions; to eliminate the dangers incident to the loosening of parts in locomotives and very large machines and to provide a safe, durable and serviceable nut lock, cheap to maintain and not unreasonably expensive to manufacture.

In the drawings, Figure 1 is a perspective view of the nut showing the double lock to prevent rotation in either direction.

Fig. 2 is a perspective view of the locking parts showing an annularly grooved roller and spring apart from the nut.

Fig. 3 is an end elevation of the double lock nut.

Fig. 4 is a cross sectional view of the double lock nut.

Fig. 5 is a perspective detail of the key.

Fig. 6 is a longitudinal sectional view of the nut, showing the lock and bolt in said nut.

Like numerals of reference indicate corresponding parts in the two groups of figures respectively.

Referring to the drawings, the nut 1 is shown as having the longitudinal slot 2 dividing the thread 3. The plate 4 is inserted in the slot 2 and is inwardly curled at the ends 5 and 6, the curled end 5 having the key opening 7 therein. The plate 4 extends from end to end in the slot 2 and is securely held therein by burring over the walls as shown at 8.

The rollers 9 and 10 are each formed with a plurality of annular grooves 11 and the reduced pin ends 12, the latter extending under the curled ends 5 and 6 of the plate 4, one on one side of the opening and the other on the other side of the opening 7. The flat springs 13 and 14 are against the side walls of the slot 4 behind the rollers 9 and 10, and the flat spring 15 is between the two rollers. The result of this arrangement is that the moment the bolt $10^a$ is inserted, the thread of the bolt engages one or other of the rollers 9 and 10 according to the direction of rotation and nothing will induce the nut to turn, as the roller 9 or the roller 10, as the case may be, proves an obstruction. To overcome this obstruction the key 16 is inserted between the rollers 9 and 10 and this straightens the rollers, so that they are parallel with the walls of the slot leaving the grooves 11 always in the way of a thread of the bolt, therefore there is no obstruction to the turning of the nut of the thread of the bolt, so long as the key remains inserted, but the moment the key is released, the springs force the rollers 9 and 10 out of alinement, which thus become a bar to further movement of the bolt and as these little rollers are made of hardened steel, they prove a very effective lock for the nut from rotation in either direction.

It must be understood that without departing from the spirit of the invention, there may be some changes in the details of construction and so long as these changes are within the scope of the claim for novelty following, the protection accorded shall not be invalidated.

What I claim is:—

A nut lock comprising a locking unit formed of a plate having inwardly curled ends and one curled end slotted for a keyway and annularly grooved rollers having end stems under curled ends, springs behind said rollers at the sides and a spring between said rollers normally closing the keyway and retaining said rollers under said curled ends, and a key for alining the rollers, said locking unit being insertible in a corresponding slot through the threads of the nut and held therein.

Signed at the city of Montreal, Quebec, Canada, this 20th day of May, 1920.

WILLIAM HENRY PALMER.